United States Patent [19]

Goebel et al.

[11] Patent Number: 4,565,752
[45] Date of Patent: Jan. 21, 1986

[54] ELECTROCHEMICAL CELL HAVING WOUND ELECTRODE STRUCTURES

[75] Inventors: Franz Goebel, Sudbury; Timothy B. Haskins, Concord; David C. Batson, Melrose, all of Mass.

[73] Assignee: GTE Government Systems Corporation, Waltham, Mass.

[21] Appl. No.: 685,638

[22] Filed: Dec. 24, 1984

[51] Int. Cl.⁴ .................... H01M 6/10; H01M 6/16
[52] U.S. Cl. ............................... 429/94; 429/194
[58] Field of Search .......................... 429/94, 194

[56] References Cited

U.S. PATENT DOCUMENTS

| | | | |
|---|---|---|---|
| 3,364,069 | 1/1968 | Deschamps | 429/94 X |
| 3,393,095 | 7/1968 | Philipp | 429/94 |
| 3,510,353 | 5/1970 | McHenry | 429/94 |
| 3,761,314 | 9/1973 | Cailley | 429/94 |
| 4,020,248 | 4/1977 | Goebel | 429/164 |
| 4,049,883 | 9/1977 | Schenk et al. | 429/94 |
| 4,053,687 | 10/1977 | Coibion et al. | 429/94 |
| 4,375,501 | 3/1983 | Peled et al. | 429/94 |

Primary Examiner—Anthony Skapars
Attorney, Agent, or Firm—J. Stephen Yeo

[57] ABSTRACT

A type of electrochemical cell has elements wound in a coil and inserted in a sealed can. One element has a metal substrate carrying a plurality of holes. The metal substrate supports layers of an electrode material such as porous carbon. Both edges and one end of the substrate is kept free of the material. The bare end of the substrate is on the outside of the coil. The substrate is wider than other elements of the coil, so that when the coil is inserted in the can, the substrate makes contact with all the internal surfaces of the can.

4 Claims, 6 Drawing Figures

ELECTROCHEMICAL CELL HAVING WOUND ELECTRODE STRUCTURES

BACKGROUND OF THE INVENTION

This invention relates to electrochemical cells. More particularly, it is concerned with electrochemical cells having wound electrode structures.

A particularly effective class of primary electrochemical cells which employs soluble or liquid cathode materials, as opposed to more conventional solid cathodes, has undergone rapid development in recent years. In these cells the active cathode material is usually a fluid solvent for an electrolyte solute which provides conductivity. The active anode of the cell is usually lithium or other highly electropositive metal. During discharge the solvent is electrochemically reduced on a cathode current collector.

In electrochemical cells of the foregoing type of cylindrical configuration one form of electrode structure which has become widely used is the so-called "wound electrode" type of electrode assembly which is described in U.S. Pat. Nos. 3,510,353 to McHenry and 4,020,248 to Goebel. With this type of electrode construction the anode electrode and the cathode current collector electrode are elongated structures which are wound in a coil to provide alternating anode and cathode current collector electrodes separated by intervening insulating material. The cylindrical battery stack thus formed is placed in a cylindrical case of a housing with appropriate electrical connections provided between the electrodes and external terminals.

Cells with the foregoing "wound electrode" battery stack arrangement may exhibit certain problems, particularly when operated under high discharge conditions. The paths of current flow from different portions of each of the electrode to the external terminals vary; and, therefore, internal temperatures and internal resistances are not uniform throughout the battery stack.

Designs have been proposed in which the battery stack is held in position with insulating washers and holddown rings. One arrangement called for the electrode coil to be wound between conductive flanges.

These arrangements require a number of assembly steps and a number of components. It is desirable to provide a "wound" cell assembly which is at least as electrically and mechanically sound as these earlier arrangements while being more economical.

BRIEF SUMMARY OF THE INVENTION

As an aspect of the invention, an electrical cell which has two electrode structures wound into a coil. The electrode structures are separated by an insulating sheet. One of the electrode structures has a metal substrate with bare borders and a bare end, free of electrode material. The bare borders of the substrate extended beyond the other elements of the coil, and the bare end of the substrate is arranged on the outside of the coil. The coil is fitted into a cylindrical metal case with a metal cover in contact with the case.

The substrate is in electrical contact with the metal case and the metal cover, as well as in contact with the cylindrical wall of the case.

For a better understanding of the present invention, together with other and further objects, advantages, and capabilities thereof, reference is made to the following discussion and appended claims in connection with the above-described drawings.

DETAILED DESCRIPTION OF THE INVENTION

Figure 1:
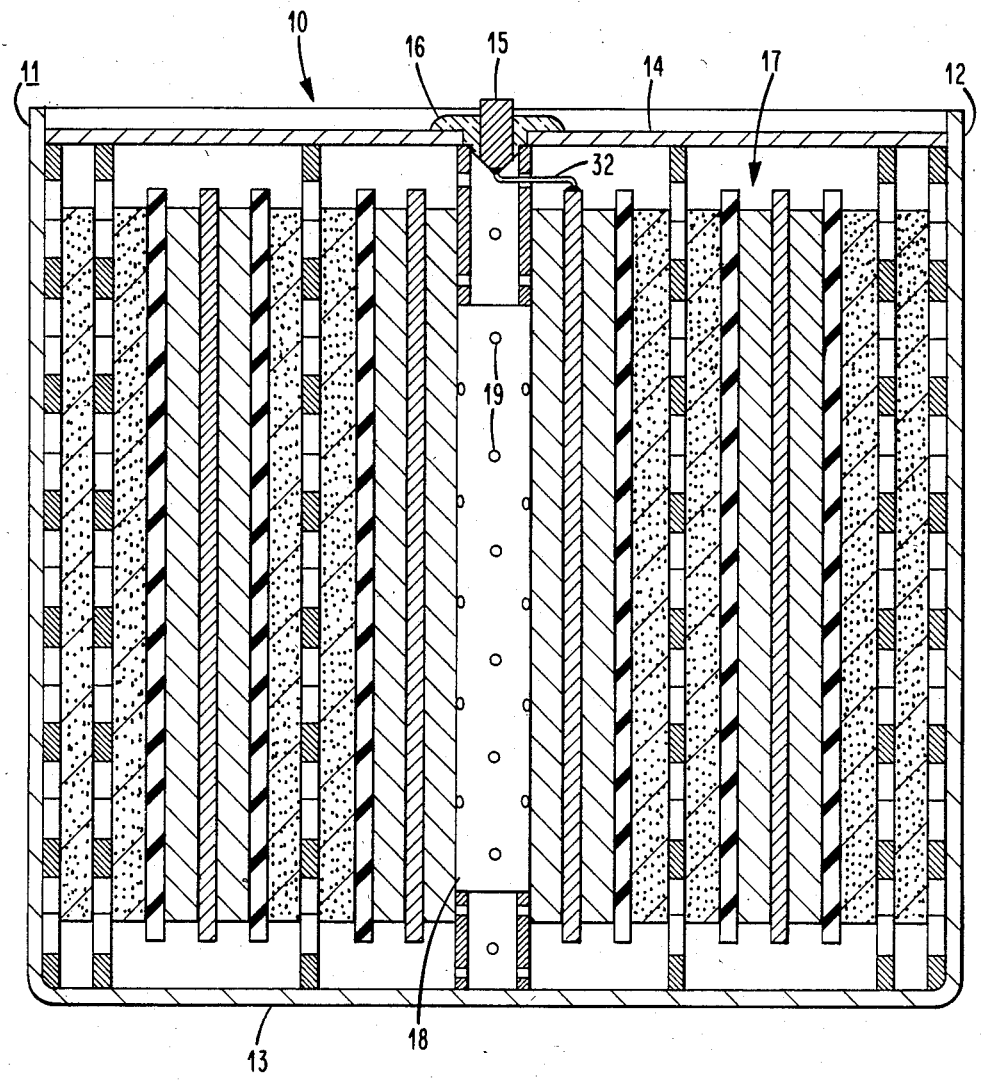
FIG. 1 is an elevational view partially in cross-section illustrating an electrochemical cell in accordance with the present invention.

FIG. 1 illustrates an electrochemical cell 10 in accordance with the present invention. The cell includes a housing of a hollow, metal case 11 with a cylindrical wall 12 and closed at one end with a generally flat bottom 13. The other end of the case 11 is closed by a metal cover 14 sealed in contact to the cylindrical wall 12. A metal terminal 15 extends through a hermetic insulating seal member 16 in the center of the cover 14.

The housing contains an electrochemical system which includes battery stack in the form of a coil 17. The coil 17 includes an assembly of electrode structures wound on a central tube 18. The tube is made of a suitable insulating material such as a fluorocarbon material which is inert to the ingredients of the electrochemical system. The tube is hollow and, as illustrated, may contain opening 19 in its walls.

Figure 2:
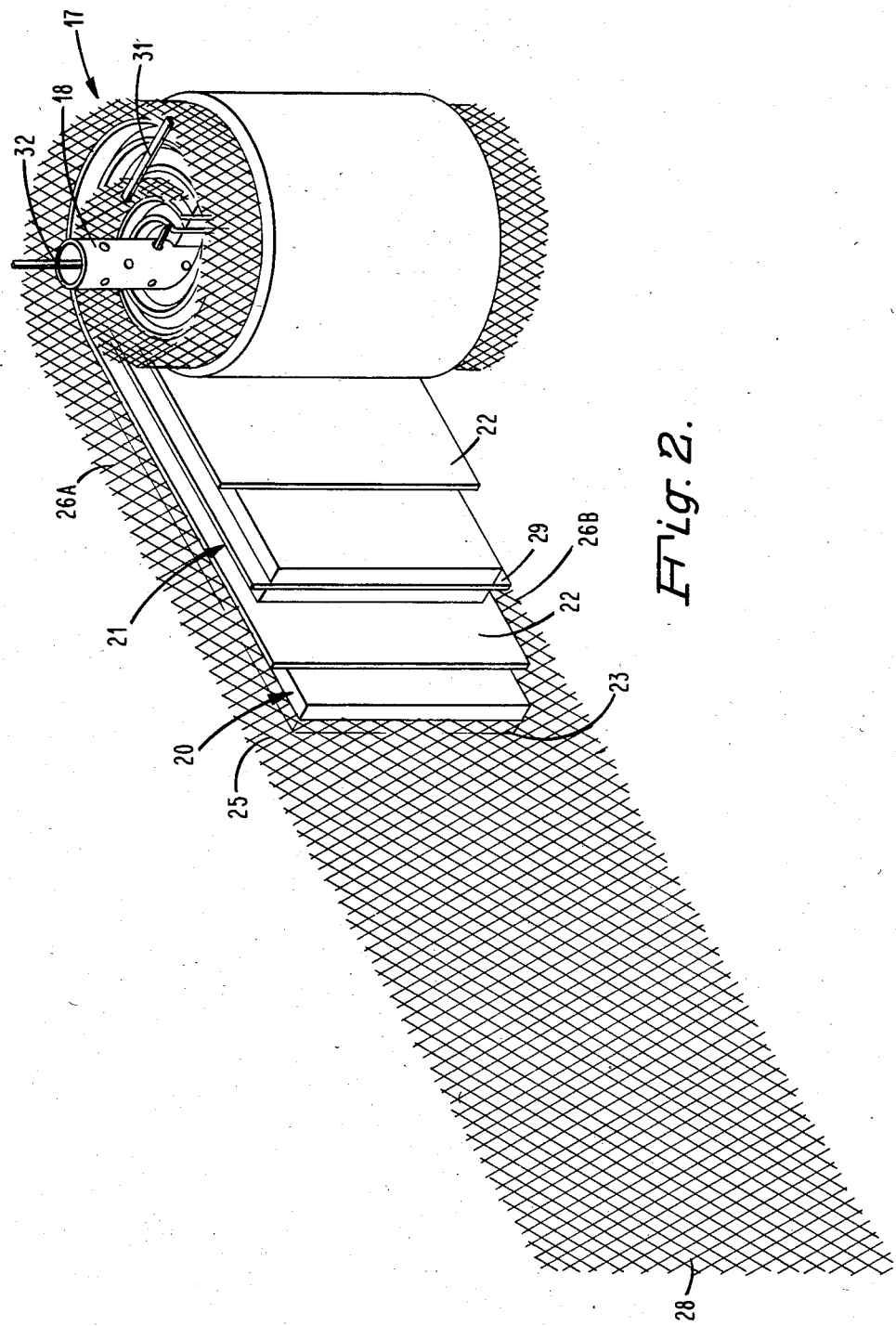
FIG. 2 is a perspective view illustrating the battery stack of the electrochemical cell of FIG. 1 with portions broken away showing the electrode structures partially wound on a tube.

Coil 17 is shown partially unwound in FIG. 2. In all the drawings, the thicknesses of the various layers of coil 17 are exaggerated to clarify the coil's construction. A first electrode structure 20, specifically a cathode current collector structure and a second electrode structure 21 specifically an anode electrode structure are wound in a coil around the central tube 18 with an intervening elongated sheet of porous insulating material 22 separating the electrode structures 20, 21 to maintain them physically separated and electrically insulated from each other. The insulating material may be porous sheets of glass fiber 0.005 to 0.020 inch thick.

Figure 3:
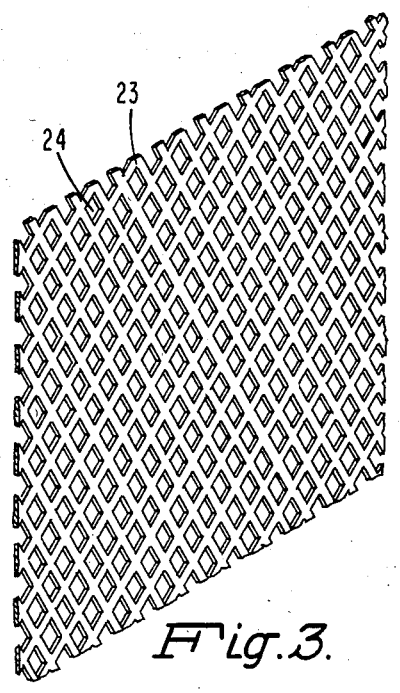
FIG. 3 is a perspective view taken in cross-section illustrating the substrate of a cathode current collector electrode structure.

The cathode current collector electrode structure 20 includes a substrate 23 of metal, e.g., nickle or stainless steel, which is inert to the ingredients of the electrochemical system. The substrate 23, which is also shown separately in FIG. 3, is preferably an elongated rectangular strip of mesh with approximately fifty percent open texture. By "mesh" it is meant any metal sheet carrying a plurality of holes 24 and includes perforated sheets, weaved wire, and expanded metal. We have found that 0.003 inch thick stainless steel stock which is cut and expanded into a lattice with 0.010 inch wide strands and about 125 diamond shaped openings per square inch is a satisfactory material for substrate 23.

Figure 4:
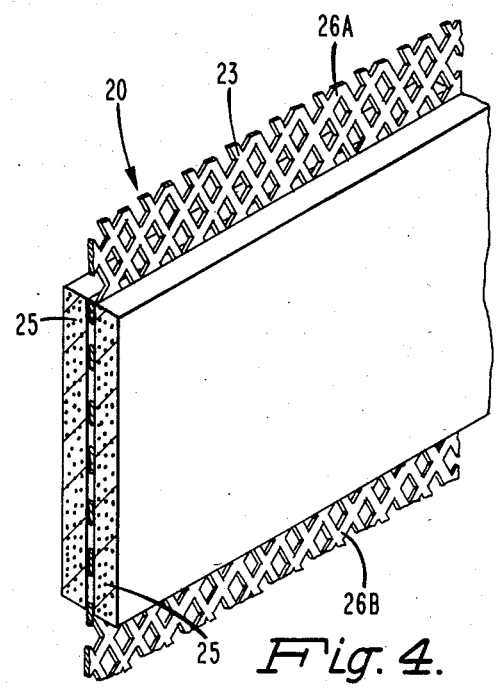
FIG. 4 is a perspective view taken in cross-section illustrating a cathode current collector electrode structure in accordance with the present invention.

FIG. 4 is a cross-sectional view of the cathode current collector electrode structure showing that both sides of the substrate 23 are covered with porous layers 40 of a suitable catalytic material for reducing liquid cathode material of the electrochemical system. Various catalyst materials are known, for example porous carbon black 0.010 to 0.020 inch thick.

As a feature of the invention, borders 26A, 26B along both edges of the substrate 23 are bare and kept free of catalyst material. Furthermore, as seen in FIG. 2, one end 28 of substrate 23 is also kept bare and free of catalyst material. The length of bare end 28 is approximately equal to the circumference of the coil 17.

Figure 5:
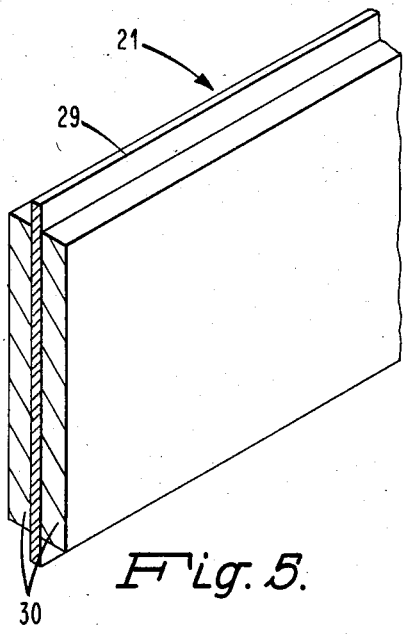
FIG. 5 is a perspective view taken in cross-section illustrating an anode electrode structure in accordance with the present invention.

Turning now to FIG. 5, there is seen the anode electrode structure 21 which includes an elongated metal substrate 29 which may be solid 0.002 inch thick nickel or stainless steel. Both sides of the substrate 29 are coated with an adherent layer 30 of a suitable, oxidizable, active anode material, for example, lithium metal. Each lithium layer 30 may be 0.005 to 0.010 inch thick.

Figure 6:
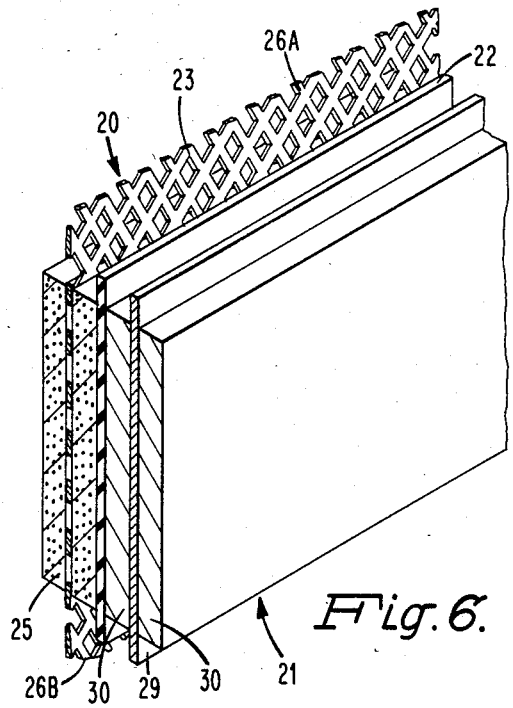
FIG. 6 is a perspective view taken in cross-section illustrating an electrode assembly including a cathode current collector electrode structure and an anode electrode structure.

As can be seen from both FIGS. 6 and 2, the resulting coil 17 (battery stack) includes alternating layers of the anode electrode structure and the cathode current collector electrode structure separated by porous insulating material 22. The width of the current collector substrate 23 is greater than the width of the anode substrate 29, and any other layers of the coil. The coil 17 is wound so that the bare end of the cathode substrate is on the outside of the coil. One or more metal strips 31 may be laid radially across the edges of the cathode substrate to lower internal electrical resistance.

Returning to FIG. 1, an electrical connector 32 couples the anode structure 21 with the metal terminal 15 at the center end of cover 14. One end of connector 32 is connected to substrate 29 and the other end is fixed to terminal 15. Terminal 23 functions as the negative terminal of the cell. Connector 32 may run along the inside of tube 18 for protection.

The bare edges of the cathode current electrode substrate 23 extends beyond the anode electrode 21 and the insulating sheet 22. The bottom edge makes physical and electrical contact with the bottom wall 13 in case 11 and the top edge 14 makes physical and electrical contact with the cover. Case 11 is substantially filled with an electrolytic solution, substantially immersing coil 17. The periphery of the cover 14 is then welded or otherwise hermetically sealed to the case wall 12. The exposed bare end of the cathode substrate makes contact with the inside of wall 12.

The cap 14 and case 11 provide support for the cathode current collector electrode structure 10 at both the top and bottom. The anode electrode structure 21 is suspended isolated from the case and cover by friction with the cathode current collector electrode structure 20.

Oxidizable materials other than lithium which may be employed in electrochemical cells as described include other alkali metals and also alkaline earth metals. The electrolytic solution comprises a solvent of a reducible liquid cathode material. Among the cathode materials found useful are fluid oxyhalides, fluid non-metallic oxides, fluid non-metallic halides, and mixtures thereof. An electrolyte solute is dissolved in the solvent in order to raise its conductivity. Specifically the solvent may be thionyl chloride and the solute lithium tetrachloroaluminate.

An electrochemical cell as described provides for uniform heat sinking along the entire length of each cathode electrode structure by virtue of the fact that both edges of the substrate 23 bear against the case bottom and cover and that a winding of the substrate 23 presses against the cylindrical wall of the case. This is believed to reduce the possibility of internal hot spots. This arrangement also provides short, uniform conductive paths for current flow, and thus losses due to internal resistance are the same throughout the battery stack. The distance from the cathode current collector to the active anode material is the same throughout the battery stack.

While there has been shown and described what is considered a preferred embodiment of the present invention, it will be obvious to those skilled in the art that various changes and modifications may be made therein without departing from the invention as defined by the appended claims.

We claim:

1. An electrochemical cell comprised of:
a metal case having a cylindrical wall and a flat bottom;
a metal cover in contact with the wall of said metal case;
a terminal extending through the center of said cover and electrically insulated therefrom;
a first electrode structure including a first elongated metal substrate having a first edge and a second edge extending along its length, a first end, and a second end;
a first electrode material covering both sides of said first substrate except for bare borders adjacent to said first and second edges of said first substrate and a bare end extending from said first end;
a second electrode structure including a second elongated metal substrate generally covered with a second electrode material;
an insulating porous sheet interposed between said first electrode structure and said second electrode structure;
said first electrode structure, said insulating porous sheet and said second electrode structure wound in a coil with said bare end of said first substrate on the outside of said coil;
said first substrate having a width greater than said second substrate;
said coil arranged within said case with one edge of said first substrate in electrical contact with said flat bottom and the other edge of said first substrate in electrical contact with said cover;
said bare end of said first substrate in contact with said wall;
conducting means for providing electrical communication between said first electrode structure and said terminal; and
an electrolytic solution substantially immersing said coil.

2. The electrochemical cell of claim 1 which further includes
a tube located in the center of said coil wherein part of said conducting means is within said tube.

3. The cell of claim 1 wherein said first elongated metal substrate has an open texture.

4. The cell of claim 1 wherein said first electrode material is porous carbon; said second electrical material is lithium metal; and said electrolyte solution is lithium tetrachloroaluminate dissolved in thionyl chloride.

* * * * *